Patented May 16, 1933

1,909,629

UNITED STATES PATENT OFFICE

HUGO PFANNENSTIEL, OF DESSAU IN ANHALT, AND WALTER JOHANNES, OF WOLFEN, NEAR BITTERFELD, GERMANY, ASSIGNORS TO WINTHROP CHEMICAL COMPANY, INC., OF NEW YORK, N. Y., A CORPORATION OF NEW YORK

MANUFACTURE OF ARTIFICIAL SPONGES FROM CELLULOSE

No Drawing. Application filed May 8, 1931, Serial No. 536,082, and in Germany June 5, 1930.

Our present invention relates to a new process of manufacturing artificial sponges which consists of regenerated cellulose. More particularly it relates to a new method of carrying out the coagulation of the viscose solution used as a starting material.

The manufacture of artificial sponges from a cellulose xanthogenate solution is known. In all of the known processes a mixture of a viscose solution and a soluble or meltable salt and, if required, fibrous substances is used as a starting material; only the coagulation conditions differ in the various processes.

As a coagulating agent an acid setting bath or a salt solution has been used, or the coagulation has been effected by means of dry heat or steam.

According to the known processes, the mass for producing the sponges is placed, for instance, in acetic acid of 10% strength and thus coagulated. This method of operation is technically unsatisfactory, since coagulation takes place only very slowly and the interior portions of larger batches are not decomposed at all. Also when using a salt solution for the same working method, a sufficient coagulation penetrating into the interior of the mass is not obtainable.

When using hot air or steam, similar difficulties arise in the case of larger batches. In this case the alkali content of the viscose mass prevents the coagulation from proceeding quickly. Furthermore, the alkali content has, according to the temperature of coagulation used, a detrimental influence upon the tenacity of the sponge article produced. The use of steam under pressure also causes certain difficulties pertaining to the apparatus.

According to this invention, an essential technical advantage is attained by using for the regeneration of the cellulose from the viscose mixed with salt crystals and, if necessary, with fibrous materials instead of steam, a hot, preferably a boiling, solution of a salt. By such a treatment, the formed masses do not lose their structure and the cellulose molecule is not decomposed, as might be presumed, but their shape is completely retained. The salt, admixed with the viscose solution in order to form the pores, is melted or dissolved out of the sponge mass in the salt solutions without any difficulty whereby the coagulating liquid can freely enter the interior of the mass. The regeneration of the cellulose, therefore, proceeds much more quickly also into the interior of larger batches. The caustic soda solution of the viscose mass hindering a quick coagulation is rapidly eliminated by the hot coagulating liquid. This is especially the case when in the salt solutions salts are used which react with caustic soda solution while reducing or neutralizing the alkaline reaction. Solutions of sodium sulfate, magnesium sulfate, magnesium chloride, sodium sulfite or mixtures of these solutions may be employed. Acids, such as sulfuric acid, hydrochloric acid, sulfurous acid, boric acid, glycolic acid, lactic acid and the like may also be added to the salt solutions. There may also be used salts of volatile bases, which are expelled by a hot caustic soda solution, such as ammonium sulfate and aniline sulfate.

As an agent for forming pores any salt soluble in the salt solution used may be employed, preferably salts containing a considerable amount of water of crystallization, such as $Na_2SO_3 + 7 H_2O$ or $Na_2SO_4 + 10 H_2O$.

Each kind of viscose may be used, we prefer, however, to start from an unripened viscose prepared from an unripened alkali cellulose, since the sponges manufactured therefrom show a greater solidity. The viscosity of the viscose solution preferably is chosen between 150 to 300 seconds measured in the ball viscosimeter (i. e. a steel-ball of 3 mm. diameter requires about 150–300 seconds to fall through a column of the viscose solution of 20 cm. height at a temperature of 20° C.). These masses, consisting of viscose and a crystallized soluble salt soon become hard after having been brought into the desired shape, and masses of small dimensions may be introduced into the hot salt solution without being confined by a container of adequate form. In the case of larger batches it may be advisable, however, to fill the sponge-forming mass into a suitable metal mould preferably perforated in order to allow free entrance of the setting salt solution. If the coagulating liquid is heated to its boiling point, a deformation or dissolving of the mass is easily avoided.

The coagulating salt baths boil at atmospheric pressure at about 100 to 105° C. They may be applied, however, in a closed chamber, in this case their temperature may be raised to about 130 to 150° C., and the time of coagulation is accordingly essentially shortened.

The volume of the finished sponges surpasses about 3 to 4 times that of the original viscose mass.

The following examples illustrate the invention:—

*Example 1.*—1330 grams of unripened viscose, prepared from unripened alkali cellulose, are intimately mixed with 4000 grams of $Na_2SO_4+10\ H_2O$ of various lump size, 200 grams of anhydrous sodium sulfate and 39 grams of hemp; compact articles, as solid as possible, are formed from the mass and placed into a boiling sodium sulfate solution containing, for instance, 25% of sodium sulfate. After boiling for several hours, according to the size of the pieces, the coagulation is complete. The sponges are taken out and freed from the salt by washing.

*Example 2.*—The working method is the same as in Example 1. There is used as a coagulation bath a boiling ammonium sulfate solution containing 35% of ammonium sulfate.

*Example 3.*—The working method is the same as in Example 1. As a coagulation bath a boiling solution containing 20% of sodium sulfate and 1-2% of magnesium sulfate is employed.

*Example 4.*—The working method is the same as in Example 1. There is used as a coagulation bath a boiling solution containing 20% of sodium sulfate and 5% of lactic acid. The operation is preferably carried out in such a manner that, after the coagulation is complete, the solution still shows an acid reaction. The lactic acid can also be added to the bath during the coagulation process, in such quantities that the solution never shows an alkaline reaction.

What we claim is:—

1. The process which comprises mixing a viscose solution with a crystalline water-soluble salt, forming compact articles of the mass and coagulating said articles in a boiling salt solution.

2. The process which comprises mixing a viscose solution with a crystalline water-soluble salt and fibrous material, forming compact articles of the mass and coagulating said articles in a boiling salt solution.

3. The process which comprises mixing a viscose solution prepared from an unripened alkali cellulose with a crystalline water-soluble salt, forming compact articles of the mass and coagulating said articles in a boiling salt solution.

4. The process which comprises mixing a viscose solution prepared from an unripened alkali cellulose with a crystalline water-soluble salt and fibrous material, forming compact articles of the mass and coagulating said articles in a boiling salt solution.

5. The process which comprises mixing a viscose solution with a crystalline water-soluble salt, forming compact articles of the mass and coagulating said articles in a boiling salt solution containing a substance binding caustic alkali.

6. The process which comprises mixing a viscose solution with a crystalline water-soluble salt, forming compact articles of the mass and coagulating said articles in a boiling salt solution containing an acid.

7. The process which comprises mixing a viscose solution with a crystalline water-soluble salt, forming compact articles of the mass and coagulating said articles in a boiling salt solution containing an ammonium salt.

8. The process which comprises mixing a viscose solution with sodium sulfate containing water of crystallization, forming compact articles of the mass and coagulating said articles in a boiling salt solution.

9. The process which comprises mixing a viscose solution prepared from an unripened alakli cellulose with sodium sulfate containing water of crystallization, and fibrous material, forming compact articles of the mass and coagulating said articles in a boiling salt solution.

10. The process which comprises mixing a viscose solution prepared from an unripened alkali cellulose with sodium sulfate containing water of crystallization, anhydrous sodium sulfate, and fibrous material forming compact articles of the mass and coagulating said articles in a boiling salt solution.

11. The process which comprises mixing 1330 parts of unripened viscose prepared from unripened alkali cellulose, with 4000 parts of $Na_2SO_4+10\ H_2O$ of various lump size, 200 grams of anhydrous $Na_2SO_4$ and 39 parts of hemp, forming compact articles of the mass and coagulating said articles in a boiling salt solution.

In testimony whereof, we affix our signatures.

HUGO PFANNENSTIEL.
WALTER JOHANNES.